United States Patent
Xu et al.

(10) Patent No.: US 8,452,075 B2
(45) Date of Patent: May 28, 2013

(54) RANGE PATTERN MATCHING FOR HOTSPOTS CONTAINING VIAS AND INCOMPLETELY SPECIFIED RANGE PATTERNS

(75) Inventors: Jingyu Xu, Beijing (CN); Subarnarekha Sinha, Menlo Park, CA (US); Charles C. Chiang, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 1304 days.

(21) Appl. No.: 11/786,683

(22) Filed: Apr. 11, 2007

(65) Prior Publication Data
US 2008/0253644 A1    Oct. 16, 2008

(51) Int. Cl.
*G06K 9/00* (2006.01)
(52) U.S. Cl.
USPC .......................... 382/149; 382/145; 382/141
(58) Field of Classification Search
USPC .......................... 382/141, 149, 152
See application file for complete search history.

(56) References Cited

U.S. PATENT DOCUMENTS

| 2002/0087941 A1* | 7/2002 | Yokota et al. ............... 716/10 |
| 2006/0045325 A1* | 3/2006 | Zavadsky et al. ............. 382/145 |
| 2006/0123380 A1* | 6/2006 | Ikeuchi ..................... 716/21 |
| 2007/0266352 A1* | 11/2007 | Cheng et al. ................. 716/4 |

* cited by examiner

*Primary Examiner* — Edward Park
(74) *Attorney, Agent, or Firm* — Park, Vaughan, Fleming & Dowler LLP; Laxman Sahasrabuddhe

(57) ABSTRACT

One embodiment of the present invention provides a system that identifies hotspot areas in a layout. The system receives the layout and a via range pattern which indicates one or more vias and performs range-pattern matching (RPM) on the layout based on a via-free range pattern derived from the via range pattern. The system further identifies at least one candidate area and determines whether via(s) in the candidate area matches the via(s) in the via range pattern. The system can also receives a range pattern with don't care regions. The system determines a core pattern from the range pattern, performs RPM based on the core pattern, and identifies a candidate area. The system then determines whether areas surrounding the candidate area match a non-core effective pattern of the range pattern. The system further determines if the areas surrounding the candidate area satisfy the constraints associated with any vias and the don't care regions.

12 Claims, 5 Drawing Sheets

(a) CORE PATTERN (b) EFFECTIVE PATTERN

RANGE PATTERN MATCHING FOR HOTSPOTS CONTAINING VIAS AND INCOMPLETELY SPECIFIED RANGE PATTERNS

BACKGROUND

1. Field of the Invention

Embodiments of the present invention relate to the design of layouts used in semiconductor manufacturing. More specifically, embodiments of the present invention relate to a method and an apparatus for identifying locations in a layout of an integrated circuit (IC) chip that are susceptible to fabrication issues.

2. Related Art

In the manufacture of IC chips, minimum feature sizes have been continuously decreasing. The current minimum feature size is smaller than the wavelength of visible light used in the conventional optical imaging system. Accordingly, it has become increasingly difficult to achieve reasonable fidelity, which is often expressed in resolution and depth of focus, between a designed layout and the shapes of actual fabricated circuit elements. Existing reticle enhancement technologies (RET's), such as optical proximity correction (OPC), phase-shifting masks (PSM's), and sub-resolution assist features (SRAF's), are becoming inadequate to solve fabrication issues on the nanometer scale.

Manufacturability-aware physical design, which takes into account both yield and reliability during the physical-design process, is becoming increasingly important in bridging the gap between design and manufacturing for nanometer-scale fabrication. Many yield and reliability issues can be attributed to certain layout configurations, referred to as "process-hotspots" or "hotspots," which are susceptible to process issues such as stress and lithographic process fluctuations. It is therefore desirable to identify and remove these process-hotspot configurations and replace them with more yield-friendly configurations.

Although it is possible to perform simulation and predict manufacturing results based on the simulation results on these physical designs, the costs of doing so on a large scale during the design process can be prohibitively high. Hence, there is a need for a technique for accurately and cost-effectively detecting process-hotspots in a given routed layout that are most susceptible to manufacturing process issues.

SUMMARY

One embodiment of the present invention provides a system that identifies hotspot areas in a layout. During operation, the system receives the layout and a via range pattern which indicates one or more vias. The system then performs range-pattern matching (RPM) to the layout based on a via-free range pattern derived from the via range pattern. The system further identifies at least one candidate area in the layout based on an RPM result and determines whether one or more vias in the candidate area match the via(s) in the via range pattern. Subsequently, the system produces a result to indicate whether the candidate area is a hotspot based on the determination.

In a variation on this embodiment, determining whether the via(s) in the candidate area match the via(s) in the via range pattern involves aligning the candidate area with the via range pattern. In addition, the system records both vertical and horizontal feature edges in the candidate area and via range pattern, wherein the vertical and horizontal feature edges include edges of the via.

In a further variation, determining whether the via(s) in the candidate area match the via(s) in the via range pattern involves comparing the vertical and horizontal feature edges in the candidate area with the corresponding vertical and horizontal feature edges in the via range pattern.

In a further variation, comparing the vertical and horizontal feature edges in the candidate area with the corresponding vertical and horizontal feature edges in the via range pattern involves calculating a distance between two vertical or horizontal feature edges in the candidate area. In addition, the system compares the calculated distance with a distance range associated with the corresponding vertical or horizontal feature edges in the via range pattern.

In a variation on this embodiment, determining whether the via(s) in the candidate area match the via(s) in the via range pattern further involves comparing the via location(s) in the candidate area with the via location(s) in the via range pattern.

In a further variation, producing the result to indicate whether the candidate area is a hotspot involves identifying the candidate area as a hotspot area when all the vias in the via range pattern are matched by corresponding vias in the candidate area with respect to vertical and horizontal feature edges, vertical and horizontal feature-edge distances, and the location of each via.

One embodiment of the present invention provides a system that identifies hotspot areas in a layout. During operation, the system receives a range pattern that contains at least one don't care region. The system then determines a core pattern based on the range pattern. The core pattern is derived based on edges of the don't care regions in the horizontal or vertical direction, and wherein features in the core pattern do not overlap with any don't care regions in the horizontal or vertical direction. The system further performs RPM to the layout based on the core pattern, and identifies at least one candidate area in the layout based on an RPM result. Next, the system determines whether areas surrounding the candidate area match a non-core effective pattern of the range pattern. The system then determines whether the areas surrounding the candidate area satisfy the constraints imposed by the don't care constraints and produces a result indicating whether the area surrounding the candidate area is a hotspot based on the determination.

In a variation on this embodiment, the system derives an effective pattern based on the range pattern. The effective pattern does not contain any don't care regions.

In a further variation, the effective pattern contains non-core effective features which are within the effective pattern but not within the core pattern.

In a further variation, the effective pattern does not contain non-core effective features.

In a further variation, determining whether areas surrounding the candidate area match one or more non-core effective patterns of the range pattern involves matching a number of features surrounding the candidate area to the features within the non-core effective pattern.

In a further variation, the system determines whether all the constraints associated with any vias and the don't care regions are satisfied by the areas surrounding the candidate area.

One embodiment of the present invention provides a system that identifies hotspot areas in a layout. During operation, the system receives a range pattern that contains only simple don't care regions. The system then enumerates a set of derived range patterns based on the range pattern, wherein the set of derived range patterns include all feature variations of the don't care regions. The system further performs RPM to a layout based on the derived range patterns and determines whether the layout matches any of the derived range patterns within one iteration step. The system then produces a result to indicate whether the candidate area is a hotspot based on the determination.

In a variation on this embodiment, determining whether the layout matches any of the derived range patterns within one iteration step involves applying an Aho-Corasick automaton to all the derived range patterns.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Figure 1:
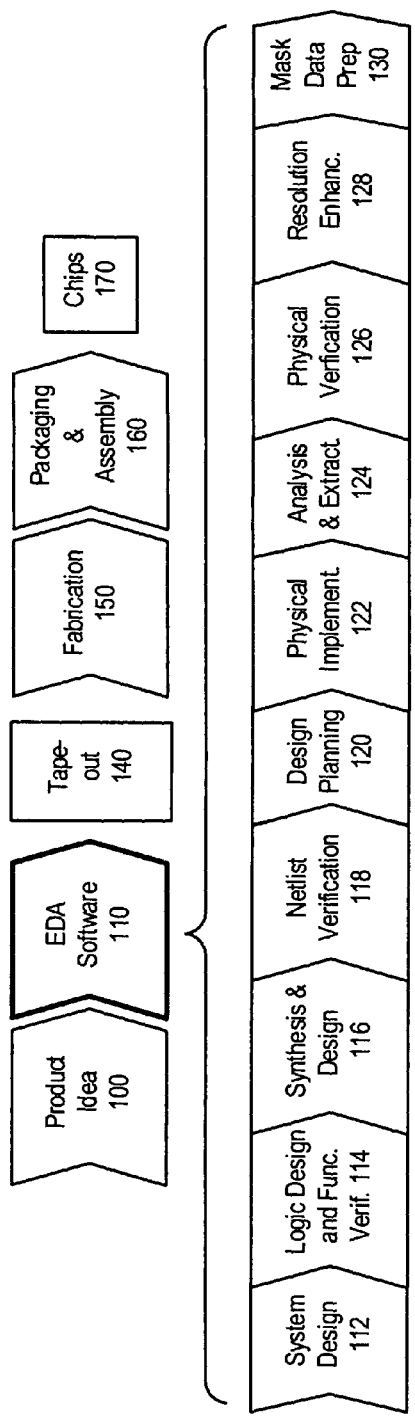
FIG. 1 illustrates various stages in the design and fabrication of an integrated circuit.

FIG. 1 illustrates various stages in the design and fabrication of an integrated circuit. The process starts with the generation of a product idea (stage 100), which is realized using an Electronic Design Automation (EDA) software design process (stage 110). When the design is finalized, it can be taped-out (stage 140). After tape-out, the fabrication process is consummated (stage 150) and packaging and assembly processes (stage 160) are performed which ultimately result in finished chips (stage 170).

The EDA software design process (stage 110), in turn, comprises stages 112-130, which are described below. Note that this design flow description is for illustration purposes only. This description is not meant to limit the present invention. For example, an actual integrated circuit design may require a designer to perform the design stages in a different sequence than the sequence described herein. The following discussion provides further details of the stages in the design process.

System design (stage 112): The designers describe the functionality to implement. They can also perform what-if planning to refine the functionality and to check costs. Hardware-software architecture partitioning can occur at this stage. Exemplary EDA software products from SYNOPSYS, INC. that can be used at this stage include MODEL ARCHITECT®, SABER®, SYSTEM STUDIO®, and DESIGNWARE® products.

Logic design and functional verification (stage 114): At this stage, the VHDL or Verilog code for modules in the system is written and the design is checked for functional accuracy. More specifically, the design is checked to ensure that it produces the correct outputs. Exemplary EDA software products from SYNOPSYS, INC. that can be used at this stage include VCS®, VERA®, DESIGNWARE®, MAGELLAN®, FORMALITY®, ESP® and LEDA® products.

Synthesis and design (stage 116): Here, the VHDL/Verilog is translated to a netlist. The netlist can be optimized for the target technology. Additionally, tests can be designed and implemented to check the finished chips. Exemplary EDA software products from SYNOPSYS, INC. that can be used at this stage include DESIGN COMPLIER®, PHYSICAL COMPILER®, TEST COMPILER®, POWER COMPILER®, FPGA COMPILER®, TETRAMAX®, and DESIGNWARE® products.

Netlist verification (stage 118): At this stage, the netlist is checked for compliance with timing constraints and for correspondence with the VHDL/Verilog source code. Exemplary EDA software products from SYNOPSYS, INC. that can be used at this stage include FORMALITY®, PRIMETIME®, and VCS® products.

Design planning (stage 120): Here, an overall floor plan for the chip is constructed and analyzed for timing and top-level routing. Exemplary EDA software products from SYNOPSYS, INC. that can be used at this stage include ASTRO® and IC COMPILER® products.

Physical implementation (stage 122): The placement (positioning of circuit elements) and routing (connection of the same) occurs at this stage. Exemplary EDA software products from SYNOPSYS, INC. that can be used at this stage include the ASTRO® and IC COMPILER® products.

Analysis and extraction (stage 124): At this stage, the circuit function is verified at a transistor level; this in turn permits what-if refinement. Exemplary EDA software products from SYNOPSYS, INC. that can be used at this stage include ASTRORAIL®, PRIMERAIL®, PRIMETIME®, and STAR RC/XT® products.

Physical verification (stage 126): In this stage, the design is checked to ensure correctness for manufacturing, electrical issues, lithographic issues, and circuitry. Exemplary EDA software products from SYNOPSYS, INC. that can be used at this stage include the HERCULES® product.

Resolution enhancement (stage 128): This stage involves geometric manipulations of the layout to improve manufacturability of the design. Exemplary EDA software products from SYNOPSYS, INC. that can be used at this stage include PROTEUS®, PROTEUS®AF, and PSMGED® products.

Mask data preparation (stage 130): This stage provides the "tape-out" data for production of masks to produce finished chips. Exemplary EDA software products from SYNOPSYS, INC. that can be used at this stage include the CATS® family of products.

Embodiments of the present invention can be used during one or more of the above-described stages. Specifically, one embodiment of the present invention can be used during physical implementation stage 122 and physical verification stage 126.

Semiconductor manufacturing technologies typically include a number of processes which involve complex physical and chemical interactions. These interactions can result in process variations and cause the characteristics of the actual integrated circuit to deviate from the original design. If this difference is too large, manufacturing problems can occur and reduce the yield and/or reduce the performance of the integrated circuit.

Process variations can arise due to a variety of reasons. For example, in photolithography, variations in the rotation speed of the spindle can cause the resist thickness to vary, which can cause variations in the reflectivity, which, in turn, can cause unwanted changes to the pattern's image. Similarly, bake plates—which are used to drive the solvents out of the wafer and form the pattern in photoresist—can have hot or cold spots, which can cause variations in the critical dimension (CD).

Range Pattern Matching

Typically, layout design engineers use design rules to represent process-hotspots. A typical design rule checker can detect such process-hotspots. However, design rules can be inefficient at representing relationships between objects in a large region, say a 1×1 µm² region which is the typical range of influence of lithography and stress effects. Moreover, with each new design rule, a new script for checking the rule needs to be generated and tested, which is a long drawn-out and error-prone process. Using simulators during physical design stages, although possible, suffers from several limitations, including lack of knowledge of downstream steps such as mask synthesis for lithography, and huge computational costs. In addition, an accurate simulator takes time to mature and may not be readily available during the design stages.

To address the aforementioned problems, a new approach called range pattern matching (RPM) has been introduced. Generally, the system uses pattern recognition techniques to detect process-hotspots. Conventional techniques are based on exact pattern representation. However, the actual pattern configurations often vary among layouts or within different regions of a layout. To capture such variations, the system is often required to store a large number of similar, exact pattern representations. Such an approach is often resource-intense and slow to operate. A range pattern can efficiently represent a group of similar patterns by defining ranges of geometric parameters of a hotspot pattern, such as length, width, and spacing. Hence, by performing range pattern matching instead of exact pattern matching, the system can significantly improve the hotspot-detection performance while reducing the computational resources.

Range Pattern Representation

Formally, a range pattern is a design-rule checking (DRC)-correct, two-dimensional layout of rectangles with the following specifications:

1. Widths and lengths of the rectangles can vary within certain user-specified bounds.
2. Spacing between pairs of rectangles can vary within certain user-specified bounds.
3. Optimal widths and lengths of the rectangles and optimal spacing between pairs of rectangles can be specified.
4. Constraints can be specified over linear combinations of the widths, lengths and spacing of the rectangles.
5. Range patterns can directly and compactly represent process-hotspots.

Figure 2:
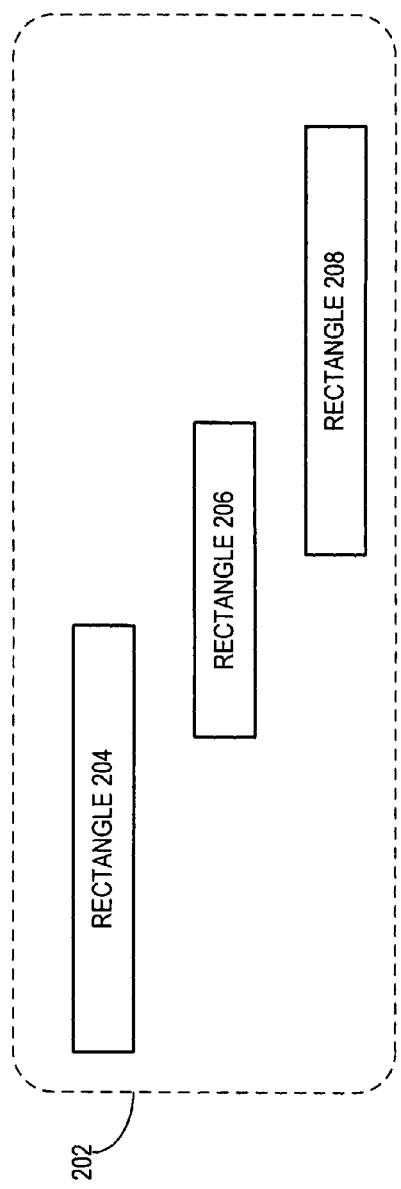
FIG. 2 illustrates an exemplary range pattern in accordance with an embodiment of the present invention.

FIG. 2 illustrates an exemplary "staircase" range pattern in accordance with one embodiment of the present invention. A range pattern 202 includes three rectangles 204, 206, and 208. The ranges of dimension and position of these rectangles are specified as follows:

1. Optimal width of each rectangle=90 nm.
2. Optimal spacing between adjacent rectangles=90 nm.
3. Range of width of all rectangles=(90, 150) nm.
4. Range of spacing between adjacent rectangles=(90, 150) nm.
5. Range of length of central rectangles=(200, 500) nm.
6. Distance between right edge of rectangle 204 and left edge of rectangle 208 cannot exceed 50 nm.

The above set of range-pattern specifications defines a multitude of exact patterns. Thus, a range pattern is a compact representation of a set of "similar" patterns. A range pattern can be translated to a pair of range graphs (one for the horizontal edges of the range pattern and one for the vertical edges of the range pattern) A range graph is defined as follows:

A range graph G is a quadruple $(V, E, \psi, \omega)$ where V and E are finite sets, $\psi: E \rightarrow \{(v,w) \in V \times V; v \neq w\}$ and $\omega: E \rightarrow \{(m,n) \in R \times R; m \leq n\}$. The elements of V are vertices, the elements of E are edges, and the elements of R are real numbers. G satisfies the condition that whenever there is an edge $e=(v, w) \in E(G)$ with $w(e)=(m, n)$, there is also an edge $\tilde{e} \in E(G)$ where $\tilde{e}=(w, v)$ and $w(\tilde{e})=(-n, -m)$. $m(n)$ is denoted as $\min(e)$ (or $\max(e)$) and is called the lower (or upper) bound of edge $e$. The range of $e$ is $|w(e)|=(n-m)$. A range graph $G=(V, E, \psi, \omega)$ is called stable if and only if the following condition is true: for each edge $e \in E(G)$, the range of $e$ is finite and minimized.

In one embodiment, the specification for a range pattern is first converted to two range graphs: one for the horizontal edges of the rectangles, denoted as HRG, and another for the vertical edges of the rectangles, denoted as VRG. Thus, each rectangle edge $r_i$ becomes a vertex $v_i$ in the corresponding range graph and an edge $e_{ij}$ exists in the range graph between any two vertices $v_i$ and $v_j$, where $i \neq j$. If the user has specified a range=$(d_1, d_2)$ and/or an absolute distance d between rectangle edges $r_i$ and $r_j$, then $w(e_{ij})$ is set to $(d_1, d_2)$ (or $(d, d)$). Otherwise, $w(e_{ij})$ is set to $(-\infty, \infty)$. Then, the ranges of all the edges are minimized to derive a stable range graph in both horizontal and vertical directions.

A definite range graph (DRG) is defined as follows. An edge $e \in E(G)$, where $w(e)=(m, n)$ and where $m \leq n$, is called definite if and only if any of the following conditions is true: $(n<0)$; $(n=m=0)$; $(m>0)$. Otherwise, e is called indefinite. A stable range graph is definite if and only if each edge therein is definite.

Given a definite edge $e=(v, w) \in E(G)$, where $w(e)=(m, n)$, vertex v is said to precede vertex w if and only if $m>0$. Two vertices are equal if and only if $m=n=0$. If vertex v precedes vertex w, then vertex v and vertex w are said to satisfy the precedence relation. If vertex v equals vertex w, then vertices v and w are said to satisfy the equivalence relation. The topological ordering of the edges in a DRG can be derived from the precedence and equivalence relationships and is unique modulo the equivalence relationships. This property is used in the derivation of cutting-slices which constitute the internal representation of a range pattern and are described in more detail below.

The RPM problem can be stated as follows: Given a layout and a range pattern, determine all occurrences of the range pattern in the layout and score these occurrences using a scoring mechanism for the range pattern.

During an RPM process, the DRGs of the range pattern in one direction (horizontal or vertical) are translated into a representation called cutting-slices. The chosen direction of the DRGs is also denoted as the slicing direction. A cutting-slice is a set of horizontal or vertical slices $\{S_0, \ldots, S_{n-1}\}$, such that adjacent slices are not equal. Each slice $S_i$ is further decomposed into fragments with specified ranges for each slice and/or fragments within the slice. A topological ordering of the rectangle edges in the DRG defines the slices and the fragments. Each DRG in the slicing direction is represented as a separate cutting-slice. Thus, a range pattern is represented by a set of cutting-slices.

In one embodiment, the layout in RPM is represented by a two-dimensional layout matrix $L_{N1 \times N2}$, which divides the layout into a grid. If a rectangle overlaps a grid location, the value at that location is set to 1. Otherwise, the value of the grid is set to 0. The RPM process uses a hierarchical dual-grid scheme, where the matching is performed on two grid sizes, one with a coarse resolution and the other with a fine resolution, typically equal to the manufacturing-grid resolution. The matching at each grid includes the following two operations:

1. Translate the layout matrix and the cutting-slices into ID strings and perform a ID string matching operation that returns a super-set of the true matches.
2. Perform slice and fragment comparison for the matches found in the first operation to remove matches that do not meet the range specification as captured in the cutting-slice representation of the range pattern.

Matching with the coarse grid usually returns a super-set of the true matches due to rounding issues caused by mis-alignment between the layout rectangle edges and the coarse grid. The match locations found during the fine grid matching are the locations where a true match to the range pattern exists and hence are true process-hotspots. In the sequel, the aforementioned RPM approach is referred to as Via-Free Completely Specified RPM (VFCS-RPM). More details of VFCS-RPM are provided in U.S. patent application Ser. No. 11/394,466, entitled "A Range Pattern Definition of Susceptibility of Layout Regions to Fabrication Issues," by inventors Subarnarekha Sinha, and Charles C. Chiang, filed 31 Mar. 2006, and U.S. patent application Ser. No. 11/395,006, entitled "Identifying Layout Regions Susceptible to Fabrication Issues by Using Range Patterns," by inventors Subarnarekha Sinha, Hailong Yao, and Charles C. Chiang, filed 31 Mar. 2006, which are incorporated by reference herein.

RPM for Layout with Vias and Incompletely Specified Range Patterns

Figure 3:
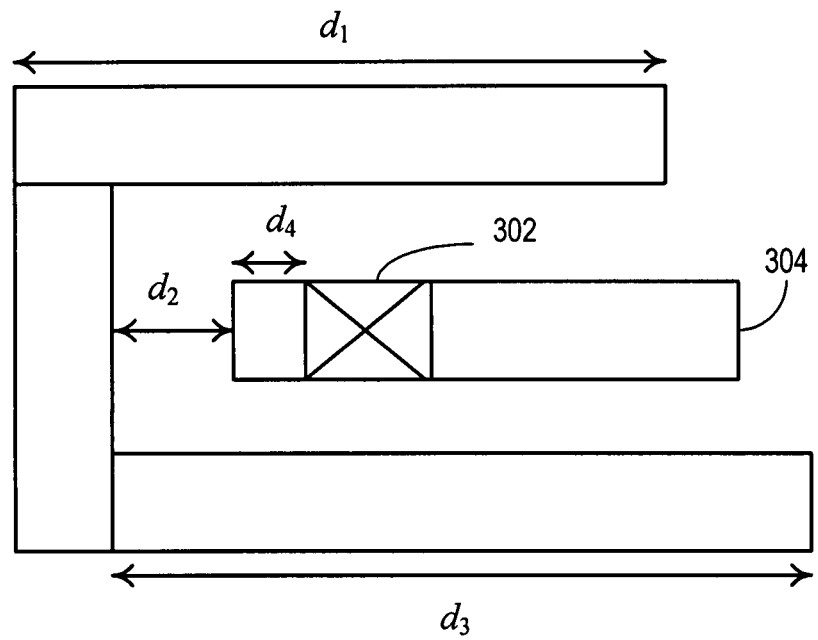
FIG. 3 illustrates an exemplary via range pattern in accordance with an embodiment of the present invention.

The VFCS-RPM process relies on a cutting-slice representation of the range pattern and a matrix representation of the layout. However, such representations are unable to distinguish between a rectangle containing no vias and a rectangle containing one or more vias, because a via is also a rectangle and is typically within another rectangle, and there is no mechanism to represent multiple rectangles simultaneously present in a particular location of the range pattern or the layout. For example, VFCS-RPM cannot differentiate a pattern as is shown in FIG. 3 with a via 302 from a similar pattern without the via. Thus, VFCS-RPM would return false matches, because the constraints related to the vias are lost.

Another limitation of VFCS-RPM is that this process cannot handle incomplete specification in range patterns (a more formal definition of incomplete specified range patterns is provided below), wherein some regions in the pattern do not have any significance and can be any configuration of DRC-correct rectangles (which are not known to the user) without impacting the status of the pattern as a hotspot. Since any configuration can appear in these regions, it is difficult to exhaustively enumerate all possible configurations. As a result, VFCS-RPM could miss some real hotspots in the layout because it can only process completely specified patterns where all the rectangles and their dimensions and relative positions are clearly specified.

Embodiments of the present invention provide a system that facilitates RPM for range patterns containing one or more vias as well as range patterns containing incompletely specified regions (or don't care regions).

In one embodiment, the range pattern used by the system can be a via range pattern, which is a range pattern that contains vias and has constraints and/or ranges involving via edges.

It should be noted that a candidate area in a layout is a match to a via range pattern if it satisfies all the constraints of the via range pattern. In one embodiment, the candidate area should have the same number of vias as the via range pattern. In a further embodiment, the candidate area can contain more vias than the via range pattern.

FIG. 3 illustrates an exemplary hotspot that contains a via. A via 302 is within a rectangle 304. The system can perform a typical check between via 302 and rectangle 304. In this example, if $d_1$ and $d_3$ are greater than a certain value, $d_2$ is within a certain range, and if the distance $d_4$ between the line edge of rectangle 304 and via 302's edge is less than a given value, the pattern would be deemed a hotspot.

Note that VFCS-RPM cannot be used to detect the hotspot as is shown in FIG. 3 because the layout and range pattern representations used during VFCS-RPM cannot represent information on vias.

In one embodiment of the present invention, a range pattern can contain one or more don't care regions. A don't care region is a region where any configuration of DRC-correct rectangles can exist. Correspondingly, an incompletely specified range pattern is a range pattern, which may or may not contain a via, and which contains a non-zero number of rectangular don't care regions. The widths and lengths of these don't care regions can vary within user-specified bounds.

Figure 4:
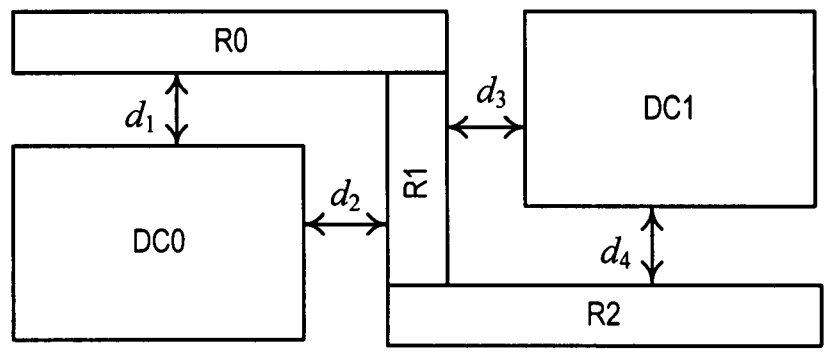
FIG. 4 illustrates an exemplary range pattern which includes two don't care regions in accordance with an embodiment of the present invention.

FIG. 4 illustrates an example of an incompletely specified range pattern in accordance with one embodiment of the present invention. In this example, there are three regular rectangles $R_0$, $R_1$, and $R_2$ as well as two rectangles DC0 and DC1 specifying don't care regions. The following constraints pertain to the relationship between the regular rectangles:

$$R1.t - R1.b = (200, 400)$$

$$R1.r - R1.l = 100$$

$$R0.r - R0.l = R2.r - R2.l = (300, 600)$$

$$R0.t - R0.b = R2.t - R2.b = 100$$

$$R1.l = R2.l$$

$$R0.r = R1.r$$

where t denotes a top edge, b denotes a bottom edge, l denotes a left edge, r denotes a right edge, and wherein the unit is nanometer.

The following constraints pertain to the relationships of the don't care rectangles to the regular rectangles:

$R0.t=DC1.t; R2.r=DC1.r$ $R2.b=DC0.b; R0.l=DC0.l$ $R2.b-DC0.t=250$ $R1.l-DC0.r=150$ $DC1.l-R1.r=200$ $DC1.b-R2.t=200.$

A simple examination of the constraints shows that the dimensions of the don't care rectangles also have ranges and each don't care rectangle can accommodate multiple rectangles.

Don't care regions can be classified as simple and general, depending on the variety of layout configurations that can appear in them. A don't care region is classified as simple if only a single rectangle of the same size as the don't care region can appear in the don't care region. That is, either a layout rectangle exists or nothing appears at all. All other types of don't care regions are classified as general don't cares. While it is clear that simple don't cares are a special case of general don't cares, it is advantageous to distinguish between the two for the following reasons: (1) only simple don't cares occur in some examples and it is easy for the user to distinguish between such cases; (2) a less resource-intense detection method can be used when only simple don't cares are present.

Figure 5:
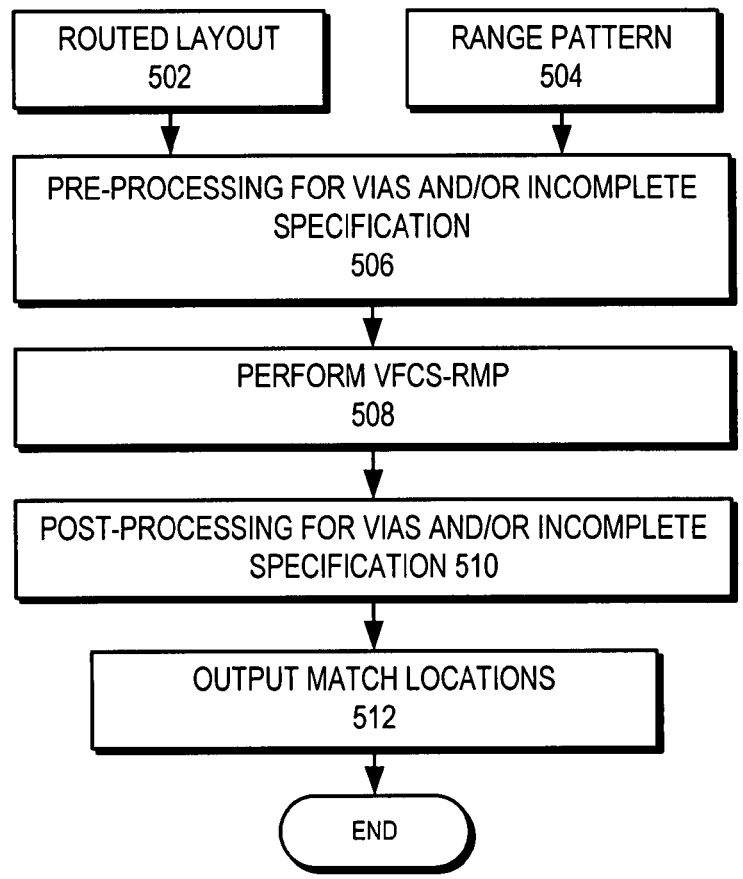
FIG. 5 presents a flowchart illustrating the process of matching via range patterns or range patterns with don't care regions in accordance with an embodiment of the present invention.

One embodiment of the present invention provides a detection system that takes as input a routed layout and a library of via range patterns and/or incompletely specified range patterns. FIG. 5 presents a flowchart illustrating the process of performing RPM for via range patterns and/or incompletely specified range patterns in accordance with one embodiment of the present invention. Note that one or more of these steps can be skipped depending on whether the pattern contains vias or is completely specified.

During operation, the system receives a routed layout 502 and a range pattern 504. Range pattern 504 can be a via range pattern and can be completely or incompletely specified. The system then performs pre-processing for the vias and/or incomplete specification in the range pattern (operation 506). During pre-processing, the system removes the via and/or incomplete specification information from the range pattern, so that the pre-processed range pattern resembles a conventional range pattern.

The system subsequently performs VFCS-RPM on the layout based on the pre-processed range pattern (operation 508). As a result, the system obtains a number of potential matches. The system then performs post-processing on the potential matches, applying additional constraints corresponding to the vias and/or incomplete specification. After post-processing, the system outputs the match locations (operation 512).

New Representation

Embodiments of the present invention adopt new representations to represent the range pattern and the layout efficiently. For convenience, the layout is referred to as a list of rectangles, since any polygon shapes can be appropriately fractured. Typically, a range pattern is represented as a horizontal range graph and a vertical range graph. Each of these range graphs represents a set of DRGs due to the presence of indefinite ranges of the form $(-a, b)$. Thus, a range pattern can be thought of as a set of DRG pairs. Each DRG pair has one DRG in the horizontal direction and one in the vertical direction.

In one embodiment, an equivalent level in the horizontal (vertical) direction is defined to be the set of horizontal (vertical) rectangle edges which share the same X (Y) coordinates for a list of rectangles or which have the equivalence relationship in a topological ordering of the edges in a horizontal (vertical) DRG.

It is possible to define the horizontal and vertical equivalent levels for DRGs because a unique topological ordering exists. It should be noted that, given a pair of DRGs (one horizontal and one vertical), the equivalent levels in the horizontal and the vertical direction are typically derived from the horizontal and the vertical DRG, respectively.

Given a pair of DRGs (one horizontal and one vertical) for a via range pattern or an incompletely specified range pattern, each rectangle of the DRGs is formed by four vertices $v_l$, $V_r$, $V_b$, and $v_t$, which correspond to the same rectangle in the range pattern specification: $v_l$ and $v_r$ are from the horizontal DRG and $v_b$ and $v_t$ are from the vertical DRG. In addition, $\min(v_l, v_r) > 0$ and $\min(v_b, v_t) > 0$.

Given a list of rectangles or a pair of DRGs (one horizontal and one vertical), a maximum connection in the horizontal (vertical) direction is a line of maximum length which starts at one vertical (horizontal) equivalent level, ends at another vertical (horizontal) equivalent level, and does not intersect any rectangle in the horizontal (vertical) direction.

In one embodiment, given the horizontal (vertical) equivalent levels of a list of rectangles or a DRG, a distance matrix $D_m$ is defined as follows:

1. The number of rows and columns of $D_m$ are equal to the number of horizontal (vertical) equivalent levels.
2. The (i,j)th entry of $D_m$ is equal to the distance or the range (as specified in the horizontal (vertical) DRG) between the rectangle edges at the ith level and jth level.

Figure 6:
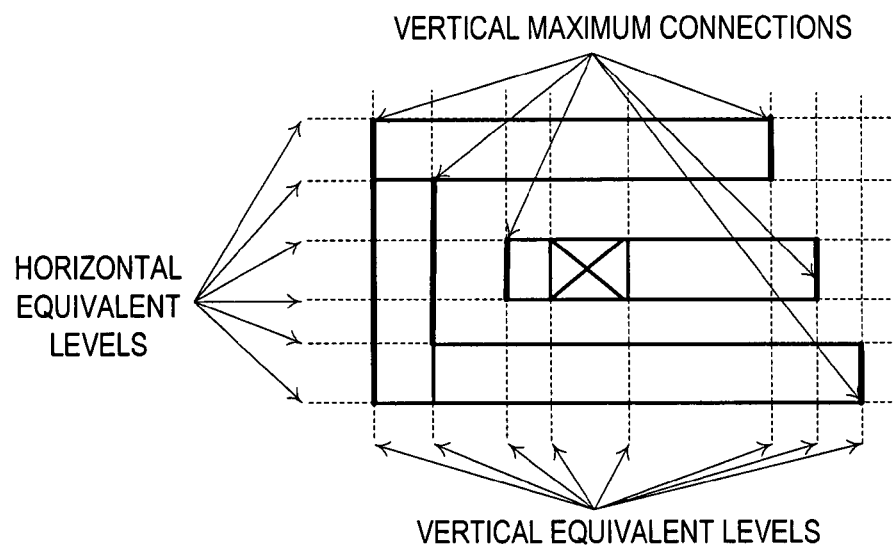
FIG. 6 illustrates exemplary horizontal equivalent levels, vertical equivalent levels, and vertical maximum connections for the pattern shown in FIG. 3 in accordance with an embodiment of the present invention.

FIG. 6 illustrates the equivalent levels and maximum connections for the range pattern shown in FIG. 3. It can be proven that the combination of the equivalent levels, maximum connections, and the distance matrices are sufficient to compare a rectangle list with a pair of DRGs, both of which have the same number of rectangles, wherein one or more of these rectangles represent vias. For example, performing a different dissection of an L-shaped, Z-shaped, or a more complex polygon in the layout and the pattern would still result in the same number of equivalent levels and maximum connections.

Detection for Via Range Patterns

Pre-processing and post-processing for via range pattern detection are described below. In the pre-processing step for via range patterns, all the vias and the constraints that involve via edges are removed to generate a modified range pattern. Then, the VFCS-RPM algorithm is invoked using this modified range pattern with a smaller set of constraints as the input range pattern. The matches returned by VFCS-RPM satisfy all the constraints for the non-via rectangles but are not guaranteed to satisfy the constraints involving the vias and/or via edges. Thus, the set of matches is a super-set of the true matches of the via range pattern. The system then invokes a post-processing check to find the true matches.

During post-processing, the system takes as input the DRG of the cutting-slice that produces a match after the VFCS-RPM process and the set of definite DRGs in the orthogonal direction. During post-processing, the system first compares the equivalent levels, maximum connections, and distance matrices of the layout for each pair of DRGs (one vertical and one horizontal). If there is a match, then the locations of the vias in the pattern and the layout are compared. If all vias in the pattern appear in the corresponding locations in the layout, a true match is returned. The detailed procedures of the post-processing are outlined in TABLE 1.

The procedure illustrated in TABLE 1 explains the case when the pattern and the layout have the same number of rectangles, including vias. If the layout has more vias, then all subsets of these vias of size k, where k is the number of vias in the pattern, is enumerated and the procedure is repeated. Typically, the number of such subsets is small and thus the impact on runtime is limited.

TABLE 1

```
1:   drg_s := DRG of cutting-slice that produces match
2:   DRG_O := Set of DRGs in the Orthogonal Direction
3:   procedure VIA_POSTPROCESS (drg_s, DRG_O)
4:      Align layout along direction of match and obtain list of layout objects
        contained in bounding box of match location.
5:      Generate the equivalent levels and the distance matrix for the layout
        objects in the slicing direction. Let them be ls_el and ls_d, respectively.
        Generate the equivalent levels and the distance matrix for the layout in the orthogonal
        direction. Let them be lo_el and lo_d, respectively.
6:      Generate the maximum connections for the layout objects in the slicing
        direction and the orthogonal direction. Let them be ls_mc and lo_mc,
        respectively.
7:      For drg_s, generate the equivalent levels and the distance matrix. Let them
        be denoted as ds_el and ds_d, respectively.
8:      For each drg_o ∈ DRG_O, generate the equivalent levels and the distance
        matrix. Let them be denoted as O_el and O_d, respectively.
9:      For each drg_o ∈ DRG_O, compute the maximum connections in both
        directions of the pair (drg_o, drg_s). Let the maximum connections in the
        slicing direction and the orthogonal direction be denoted as O^s_mc and O^o_mc,
        respectively.
10:     Set match_1 = FALSE, match_2 = FALSE
11:     If ls_el = ds_el and min ≤ v ≤ max, where v is an entry of ls_d and (min, max) is
        a corresponding entry of the distance matrix ds_d, then set match_1 = TRUE.
12:     for all po_el ∈ O_el, po^s_mc ∈ O^s_mc, po^o_mc ∈ O^o_mc, and po_d ∈ O_d do
13:        If lo_el = po_el and lo_mc = po^o_mc and ls_mc = po^s_mc and min ≤ v ≤ max,
           where v is an entry of lo_d and (min, max) is a corresponding entry of
           the distance matrix po_d, then set match_2 = TRUE and set
           match = match_1 ^ match_2.
14:     for all via v in pattern do
15:        Determine if there exists a via in the layout with the same
           horizontal and vertical equivalent levels as v.
16:        if no such via exists, set match = FALSE
17:     end for
18:     if match = TRUE, go to step 20
19:     end for
20:     Output match
21:  end procedure
```

Detection for Incompletely Specified Range Patterns

The pre-processing and post-processing steps as they apply to incompletely specified range patterns are described below. One embodiment adopts a definition of sub-patterns that can be extracted from the incompletely specified range pattern.

Given an incompletely specified range pattern IRP and a left boundary vertex lb, a right boundary vertex rb, a bottom boundary vertex bb and a top boundary vertex tb, the vertical (horizontal) range graphs of the core pattern, henceforth referred to as VCRG (HCRG) are derived from the corresponding vertical (horizontal) range graph of IRP, denoted as VIRG (HIRG):

The set of vertices and a mapping function $f$ between the vertices of VIRG(HIRG) and the vertices of VCRG(HCRG) are generated as follows:

1. The boundary vertices lb (bb) and rb (tb) in VIRG (HIRG) correspond to new vertices LB and UB in VCRG (HCRG); $ff(LB)=lb(bb)$ and $ff(UB)=rb(tb)$.
2. Given $e_1=\{lb(bb), v_i\}$ and $e_2=\{v_i, rb(tb)\}$ in VIRG (HIRG):
   (a) If $min(e_1)>0$ and $min(e_2)>0$, then $v_i$ appears as a new vertex $\hat{v}_i$ in VCRG(HCRG); $f(\hat{v}_i)=v_i$.
   (b) If $min(e_1)<0$, $\hat{v}_i=LB$; $f(\hat{v}_i)=lb(bb)$.
   (c) If $min(e_2)<0$, $\hat{v}_i=UB$; $f(\hat{v}_i)=rb(tb)$.

The set of edges is derived as follows: For each edge $e=(v_i, v_j)$ in VIRG(HIRG), an edge $\hat{e}=(\hat{v}_i, \hat{v}_j)$ is added and set:

$$min(\hat{e})=min(f(\hat{v}_i), f(\hat{v}_j)) \text{ and } max(\hat{e})=max(f(\hat{v}_i), f(\hat{v}_j)).$$

Generally, the core pattern includes all the rectangles that are contained within the bounding box {lb, bb, rb, tb} relative to which it is defined. All rectangles that extend beyond the bounding box are clipped to align with the bounding box. The ranges of the rectangles that are completely contained within the bounding box are the same as before, whereas the ranges of the remaining rectangles are suitably adjusted.

Given an incompletely specified range pattern IRP and a set of general don't care rectangles SDC, the vertical (horizontal) range graphs of the effective pattern, henceforth referred to as VERG(HERG) is derived from the corresponding vertical (horizontal) range graph of IRP, denoted as VIRG (HIRG), as follows:

1. The set of vertices of VERG(HERG) include the vertices of VIRG(HIRG) after excluding all the vertices that correspond to edges belonging to the rectangles in SDC.
2. The set of edges of VERG(HERG) include the edges of VIRG(HIRG) after excluding all the edges where one or both of the vertices correspond to edges belonging to the rectangles in SDC.

The effective pattern includes all the non-don't care rectangles in the given incompletely specified pattern and their relative constraints. The set of rectangles that appear in the core pattern and the effective pattern are called the core rectangles and the effective rectangles, respectively. It should be noted that it is not necessary for them to be equal as some non-don't care rectangles may be removed during the generation of the core pattern. The difference between these two sets of rectangles is referred to as the non-core effective rectangles.

Figure 7:
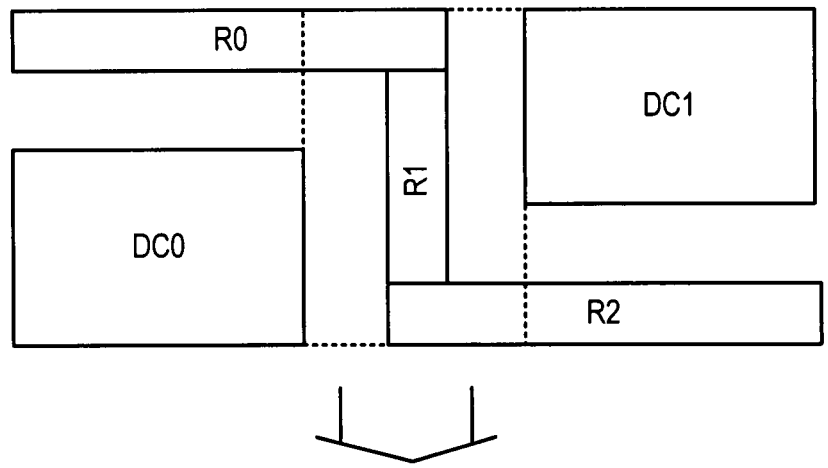
FIG. 7 illustrates an exemplary core pattern and effective pattern for the pattern shown in FIG. 4 in accordance with an embodiment of the present invention.
Figure 7:
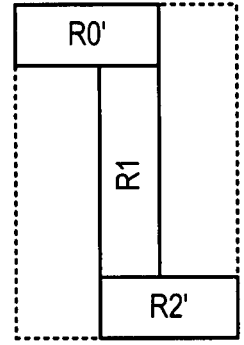
Figure 7:
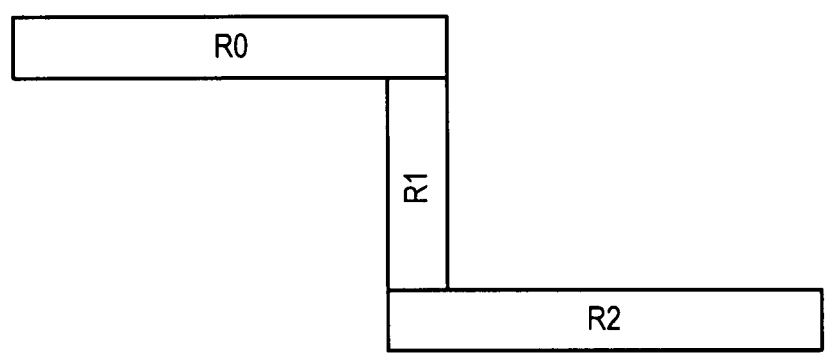

In FIG. 7, patterns (a) and (b) illustrate the core pattern and the effective pattern for the pattern in FIG. 4, respectively. Let the left boundary, right boundary, bottom boundary and top boundary with respect to which the core pattern is defined be the right boundary of DC0, left boundary of DC1, the bottom boundary of R2, and top boundary of R0, respectively. Based on the dimension restrictions for that particular pattern, the minimum and maximum allowable length of R0' and R2' is 150 and 200, respectively.

The pre-processing step for matching with general don't cares includes extracting the core pattern and the effective pattern for a given incompletely specified range pattern. The key task is to identify the boundary with respect to which the core pattern is extracted. The first step is to identify the general don't cares at each boundary. A don't care rectangle is deemed to be a boundary don't care rectangle if no non-don't care rectangle exists between it and the boundary, i.e. a horizontal line drawn from the left (right) edge of the don't care rectangle toward the boundary should not intersect any non-don't care rectangle. The don't care rectangles at each of the boundaries (left, right, top, and bottom) are identified.

It is possible for a don't care rectangle to belong to multiple boundaries. Hence, all options for the boundary of the core pattern are considered by enumerating all cases: each case is generated by assigning every don't care rectangle to only one among the multiple boundaries it can belong to. For each case, the don't care rectangles assigned to the left, right, bottom and top boundaries are denoted as LDC, RDC, BDC and TDC, respectively. Note that each don't care rectangle at the boundary is uniquely assigned to one of LDC, RDC, BDC and TDC. Then, the left (right) boundary of the core pattern for this case is set to the right (left) edge of the don't care rectangle that appears furthest to the right (left) in LDC (RDC). The bottom and top boundaries are similarly computed. If either of the sets is empty, then the corresponding boundary is set to be equal to the corresponding boundary of the original pattern. The range graphs of the core pattern with respect to this set of boundary vertices are computed.

In one embodiment, this process is repeated for all the cases and the one that produces the largest core pattern (as measured by the product of the lengths of the longest path in the horizontal and vertical range graphs) is selected. In a further embodiment, the process needs to be repeated until the first non-empty core pattern is obtained. As a final step, the range graphs of the effective pattern for the given incompletely specified pattern are also computed.

The core pattern after removing all vias and all via-related constraints is used as the input pattern during VFCS-RPM to obtain a set of locations. VFCS-RPM is changed slightly to ensure no loss of true matches. For constraints that specify distance ranges between edges at the boundary of a core pattern and any other edge, only the lower bound of the range is checked, i.e. the distance between the two edges of these constraints should be greater than or equal to the lower bound of the range in a match returned by VFCS-RPM. This relaxation is necessary since several rectangles that extend beyond the boundary are clipped during the generation of the core pattern. Thus, the upper bounds of the ranges of the constraints involving boundary edges may be smaller than their values in the original pattern. This relaxation combined with the fact that the core pattern contains a subset of the constraints in the original pattern ensures that the matches returned by VFCS-RPM are a super-set of the true match locations for the original incompletely specified pattern. For example, for the core pattern shown in FIG. 7 (a) (the region within dashed lines), all locations that satisfy the range on R1 and have top and bottom rectangles that are greater than or equal to 150 nm and 200 nm, respectively, will be identified as potential matches after VFCS-RPM.

The post-processing step takes as input the locations returned after VFCS-RPM and eliminates the false matches based on the specifications in the original pattern. At the first step of post-processing, each match location is expanded by the largest possible amount in either direction. The distance in each direction is derived by computing the largest distance between the edge that forms the bounding box of the original pattern and the edge of the don't care rectangle that forms the boundary of the core pattern in that direction. Then, all subsets of rectangles in the region that are present outside the match location for the core pattern and are of size k are enumerated. The value of k is equal to the number of non-core effective rectangles.

Instead of enumerating all subsets, a smart filtering scheme based on checking equivalent levels and maximum connections in multiple windows containing this subset of rectangles can be used. This pre-filtering step checks if a particular subset is a likely candidate for the non-core effective rectangles. If the subset passes the match, a further check is done to see if $R_e$, the union of rectangles in the core pattern and the chosen subset of non-core effective rectangles, satisfies all the constraints of the effective pattern.

The fine-grid matching step of VFCS-RPM is then invoked. If this check is satisfied, it means that the non-via rectangles in $R_e$ matches all the constraints of the non-via effective rectangles for the given pattern. Let the set of match locations at the end of this step be denoted as $PM_1$. The next task is to determine if each candidate match in $PM_1$ satisfies all the constraints specified by the vias and the don't care regions that were excluded from the core pattern in the original range pattern. These checks are done in a sequential fashion. Each match in $PM_1$ passes through the via check using the VIA_POSTPROCESS procedure as described in TABLE 1, if the original incompletely specified pattern has vias.

If a match is returned after this step, the procedure CHECK_DCS, outlined in TABLE 2, is invoked on the match location to determine if it also satisfies all the constraints imposed by the don't care regions. In other words, this check ensures that, for each match location, no rectangles other than the effective rectangles appear in the regions not covered by the don't care regions.

It can be proven that the post-processing procedure described herein does not lose any true matches. This procedure also works for the case when there exists at least one core region that has no general don't cares. This is not a limitation because a well-defined configuration of objects always exists near the central portion of each process-hotspot. However, this does not mean it is not necessary to check the peripheral regions because these regions typically contain some non-don't care objects as well.

TABLE 2

1: $drg_s$, $drg_o$ := DRGs of Effective Pattern (in slicing and orthogonal direction) which match the layout fragment containing effective rectangles.
2: $R_e$ := Set of layout rectangles such that it is a match to the DRGs of the effective pattern
3: SDC := Set of don't care regions in the pattern.
4: procedure CHECK_DCS ($drg_s$, $drg_o$, $R_e$, SDC)

TABLE 2-continued

5:   Obtain set of rectangles $R_a$ within $B_e$, where $B_e$ is the bounding box formed by the rectangles in $R_e$.
6:   Compute $R_x = \{r | r \in R_a$ and $r \notin R_e\}$.
7:   for all $d^p{}_i \in SDC$ do
8:       for all neighboring effective rectangle edges $r_i$ of $d^p{}_i$ do
9:           Obtain the spacing $s_i$ using the definite range graphs of the effective pattern. $s_i$ is equal to the minimum value of the range
10:          Obtain the edge(s) in the layout L whose equivalent level in the layout fragment is equal to the equivalent level of $r_i$ in the definite range of the effective pattern.
11:          Compute the don't care region $d^j{}_i$ in $B_e$ using the appropriate coordinates of L and spacing $s_i$.
12:          Compute $R_x := \{r | r \in R_x$ and $r$ is not completely contained in $d^j{}_i\}$
13:      end for
14:  end for
15:  If $R_x = \emptyset$, set match = TRUE; Else match = FALSE.
16: end procedure Fast Detection with Simple Don't Care Regions As mentioned before, a simple don't care implies either a rectangle exists and covers the entire don't care region or no rectangle exists at all in that region. In one embodiment, the system adopts a fast-detection procedure as follows.

Given a pattern with n simple don't cares, all $2^n$ range patterns are enumerated. This covers each combination of rectangles being present or absent in each don't care region. Each of these $2^n$ range patterns is completely specified and thus can be detected using VFCS-RPM along with the VIA_POSTPROCESS procedure, depending on whether vias are present. In one embodiment, the system calls the VFCS-RPM procedure for each of these patterns individually. However, a significant portion of the runtime might be spent on 1D matching which uses a filtering step to identify a super-set of the true matches, since all the layout locations are processed in this step. Instead, using a 1D matching solution that can work on multiple patterns at the same time such as using an Aho-Corasick automaton can significantly speed up the filtering step. This approach is used to simultaneously identify a super-set of the matches for all the $2^n$ patterns simultaneously. The system then determines whether it is a true match relative to the cutting-slice constraints for that grid, and further performs the VIA_POSTPROCESS procedure, if necessary.

Experimental results presented in the next section show that this enhancement results in sizable speed-ups, especially as the number of don't care regions increases. The same approach could be used for improving the efficiency of matching multiple unrelated patterns which are of approximately the same dimensions.

Experimental Results

This section presents results which validate the detection system for via range patterns and incompletely specified range patterns. Nine range patterns are used. Out of these nine range patterns, only those containing vias and/or don't care regions are presented here. These range patterns are characterized based on the following criteria: presence of vias, type of don't care regions, and number of don't care regions.

The key characteristics of the range patterns obtained are summarized in TABLE 3. Note that the majority of the patterns have don't care regions, wherein pattern P2 has two general don't care regions. In addition, three of the patterns have constraints/ranges on via edges. The patterns are all tested on a 65 nm layout with a size of 1.5×1.5 mm², and the results are presented in TABLEs 4 and 5.

TABLE 3

| Range Pattern | Via? | Don't Care? | # Don't Care Regions |
|---|---|---|---|
| P1 | Yes | Simple | 2 |
| P2 | Yes | General | 2 |
| P3 | Yes | Simple | 2 |
| P4 | No | Simple | 5 |
| P5 | No | Simple | 2 |
| P6 | No | Simple | 2 |

TABLE 4

| Range Pattern | VFCS-RPM | Inventive Procedure | Runtime (s) |
|---|---|---|---|
| P1 | 1951 | 1851 | 45 |
| P2 | 5876 | 5231 | — |
| P3 | 6770 | 289 | 0.43 |

TABLE 5

| Range Pattern | # w.o don't cares | # w. don't cares | Runtime(New) (s) | Runtime(Old) (s) |
|---|---|---|---|---|
| P1 | 1554 | 1851 | 196.04 | 323.09 |
| P2 | 2492 | 5231 | 675.04 | — |
| P3 | 287 | 289 | 89.57 | 184.17 |
| P4 | 16 | 18 | 339.77 | 3220.36 |
| P5 | 302 | 338 | 494.04 | 2054.62 |
| P6 | 76 | 90 | 322.97 | 1463.69 |

TABLE 4 summarizes the results of via range pattern detection. Column 2 presents the number of matches returned by the VFCS-RPM procedure alone. The number of matches returned after using the present inventive detection procedure, which includes pre-processing and post-processing in conjunction with VFCS-RPM, is reported in Column 3. The results indicate that many false matches are returned by VFCS-RPM. This is undesirable because false matches can negatively impact the yield scoring of a design and also place an unnecessary burden on the router, if it has to take corrective action. The extra runtime required with the additional pre-processing and post-processing time is reported in the last column.

TABLE 5 presents the results for the don't care regions. The number of matches returned without the don't care regions are reported in Column 2, whereas Column 3 reports the number of matches when the don't care regions are present in each pattern and are appropriately processed using the present inventive procedure. The smaller number of matches in Column 2 clearly indicate that the don't care abstraction is useful and not allowing for don't care regions would result in a loss of matches. The runtime results for the entire algorithm are presented in Column 4. For patterns containing only simple don't care regions, the fast-detection procedure is used. The runtime-efficient version of the VFCS-RPM procedure is used, which does the 1D filtering for all matches simultaneously. Column 5 reports the runtime corresponding to VFCS-RPM, wherein each pattern is treated completely independently. The comparison is only done for the patterns with simple don't cares, as the enumeration technique is not used for general don't cares.

The numbers indicate a clear speed-up using the present inventive procedure. Note that simple don't cares cannot replace general don't cares. For instance, if the general don't cares in P2 are represented as simple don't cares, then 45 true matches are lost. This indicates that the general don't cares provide an extra dimension of flexibility that cannot be completely captured by simple don't cares.

System Operation

Figure 8:
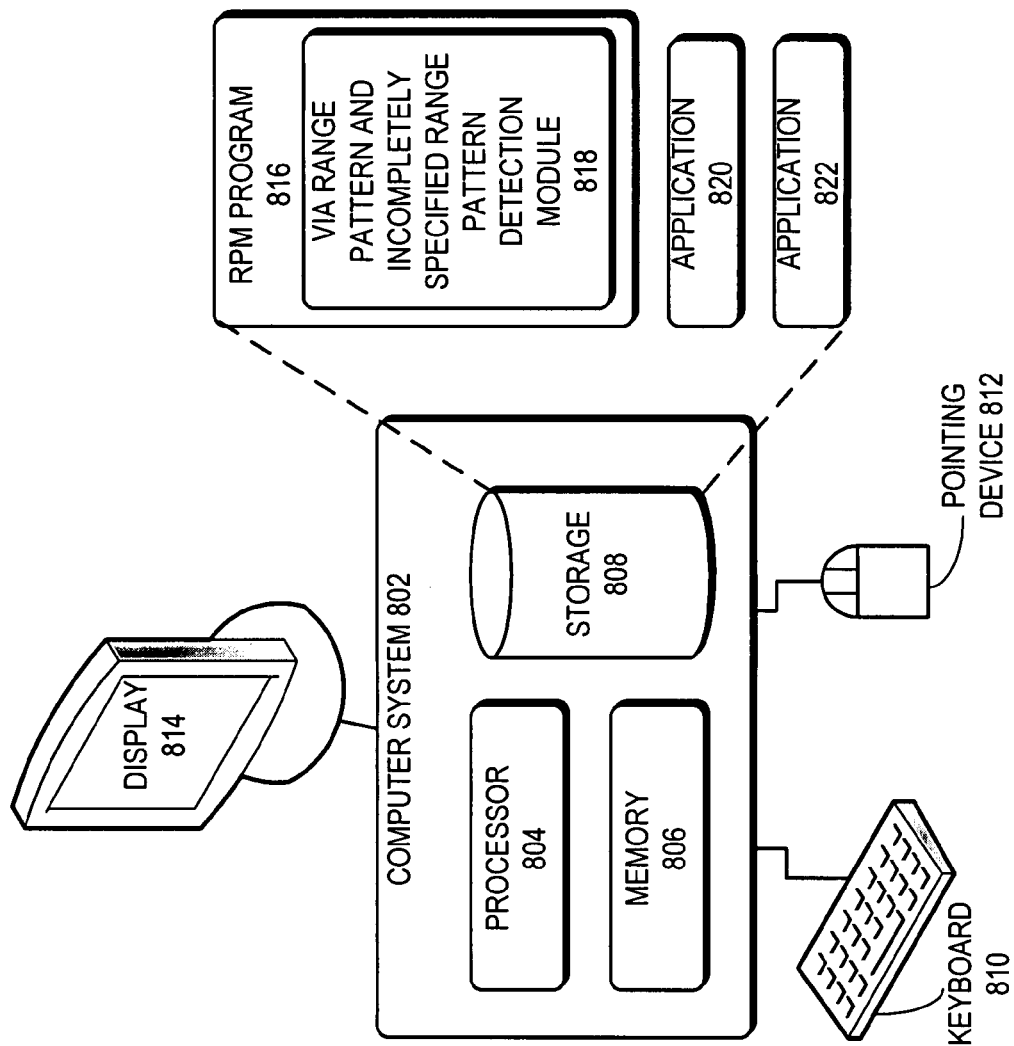
FIG. 8 illustrates an exemplary computer system that performs detection of via range patterns and/or range patterns with don't care regions in accordance with an embodiment of the present invention.

FIG. 8 illustrates an exemplary computer system that facilitates via range pattern and incompletely specified range pattern detection in accordance with one embodiment of the present invention. A computer system 802 includes a processor 804, a memory 806, and a storage device 808. Computer system 802 is also coupled to a display 814, a keyboard 810, and a pointing device 812.

Storage device 808 stores an RPM program 816 as well as applications 820 and 822. In one embodiment, RPM program 816 contains a via range pattern and an incompletely specified range pattern detection module 818. During operation, RPM program 816 is loaded into memory 806, and is executed by processor 804 to perform via range pattern detection and/or incompletely specified range pattern detection. Display 814 presents the corresponding results.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying hotspot areas in a layout, the method comprising:
   receiving the layout and a via range pattern which indicates one or more vias;
   generating a via-free range pattern from the via range pattern by removing the one or more vias from the via range pattern;
   performing range-pattern matching (RPM) on the layout based on the via-free range pattern;
   identifying at least one candidate area in the layout based on an RPM result;
   determining, by one or more computers, whether the candidate area contains a via that matches the via in the via range pattern; and
   producing a result to indicate whether the candidate area is a hotspot based on the determination.

2. The method of claim 1, wherein determining whether one or more vias in the candidate match the via(s) in the via range pattern comprises:
   aligning the candidate area with the via range pattern; and
   recording both vertical and horizontal feature edges in the candidate area and via range pattern, wherein the vertical and horizontal feature edges include edges of the via.

3. The method of claim 2, wherein determining whether the via(s) in the candidate matches the via(s) in the via range pattern further comprises:
   comparing the vertical and horizontal feature edges in the candidate area with the corresponding vertical and horizontal feature edges in the via range pattern.

4. The method of claim 3, wherein comparing the vertical and horizontal feature edges in the candidate area with the corresponding vertical and horizontal feature edges in the via range pattern comprises:
   calculating a distance between two vertical or horizontal feature edges in the candidate area; and
   comparing the calculated distance with a distance range associated with the corresponding vertical or horizontal feature edges in the via range pattern.

5. The method of claim 2, wherein determining whether the via(s) in the candidate area matches the via(s) in the via range pattern further comprises:
   comparing the via location in the candidate area with the via location in the via range pattern.

6. The method of claim 5, wherein producing the result to indicate whether the candidate area is a hotspot comprises:
   identifying the candidate area as a hotspot area when all the vias in the via range pattern are matched by corresponding vias in the candidate area.

7. A non-transitory computer-readable storage medium storing instructions that when executed by a computer cause the computer to perform a method for identifying hotspot areas in a layout, the method comprising:
   receiving the layout and a via range pattern which indicates one or more vias;
   generating a via-free range pattern from the via range pattern by removing the one or more vias from the via range pattern;
   performing range-pattern matching (RPM) on the layout based on the via-free range pattern;
   identifying at least one candidate area in the layout based on an RPM result;
   determining whether the candidate area contains a via that matches the via in the via range pattern; and
   producing a result to indicate whether the candidate area is a hotspot based on the determination.

8. The non-transitory computer-readable storage medium of claim 7, wherein determining whether one or more vias in the candidate match the via(s) in the via range pattern comprises:
   aligning the candidate area with the via range pattern; and
   recording both vertical and horizontal feature edges in the candidate area and via range pattern, wherein the vertical and horizontal feature edges include edges of the via.

9. The non-transitory computer-readable storage medium of claim 8, wherein determining whether the via(s) in the candidate area matches the via(s) in the via range pattern further comprises:
   comparing the vertical and horizontal feature edges in the candidate area with the corresponding vertical and horizontal feature edges in the via range pattern.

10. The non-transitory computer-readable storage medium of claim 9, wherein comparing the vertical and horizontal feature edges in the candidate area with the corresponding vertical and horizontal feature edges in the via range pattern comprises:
    calculating a distance between two vertical or horizontal feature edges in the candidate area; and
    comparing the calculated distance with a distance range associated with the corresponding vertical or horizontal feature edges in the via range pattern.

11. The non-transitory computer-readable storage medium of claim 8, wherein determining whether the via(s) in the candidate area matches the via(s) in the via range pattern further comprises:
    comparing the via location in the candidate area with the via location in the via range pattern.

12. The non-transitory computer-readable storage medium of claim 11, wherein producing the result to indicate whether the candidate area is a hotspot comprises:
    identifying the candidate area as a hotspot area when all the vias in the via range pattern are matched by corresponding vias in the candidate area.

* * * * *